(No Model.)

A. R. WITMER.
Car Starter.

No. 235,324. Patented Dec. 7, 1880.

WITNESSES:
Chas. Nida.
C. Sedgwick.

INVENTOR:
A. R. Witmer
BY Munn & Co.
ATTORNEYS.

UNITED STATES PATENT OFFICE.

ABRAHAM R. WITMER, OF SAFE HARBOR, PENNSYLVANIA.

CAR-STARTER.

SPECIFICATION forming part of Letters Patent No. 235,324, dated December 7, 1880.

Application filed July 29, 1880. (No model.)

*To all whom it may concern:*

Be it known that I, ABRAHAM R. WITMER, of Safe Harbor, in the county of Lancaster and State of Pennsylvania, have invented a new and useful Improvement in Car-Starters, of which the following is a specification.

Figure 1:
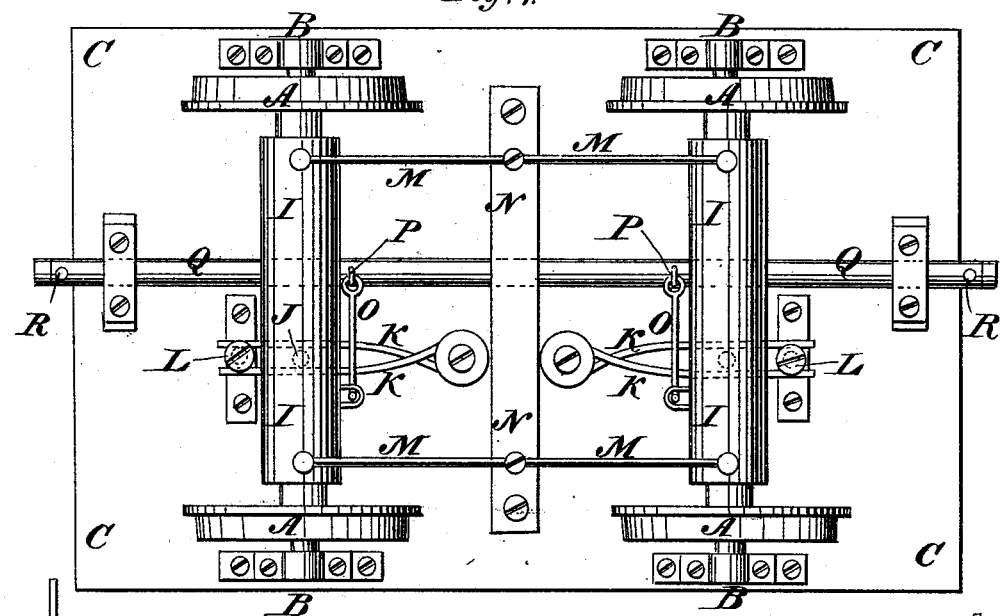
Figure 2:
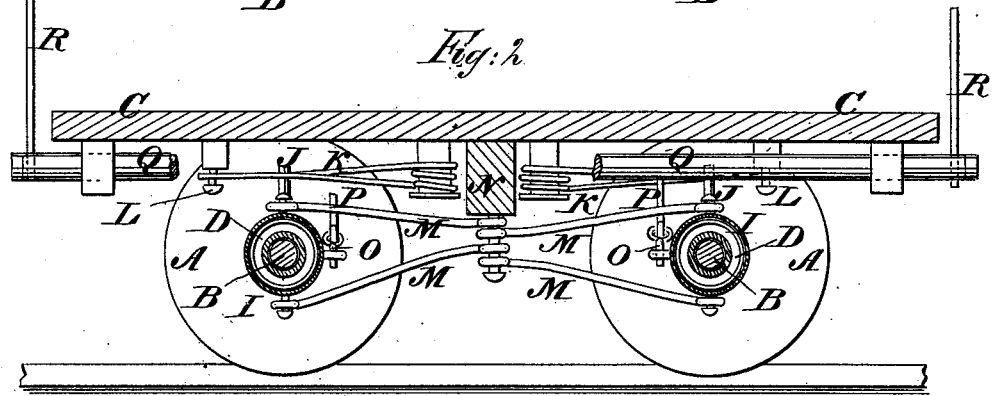
Figures 3, 4, 5:
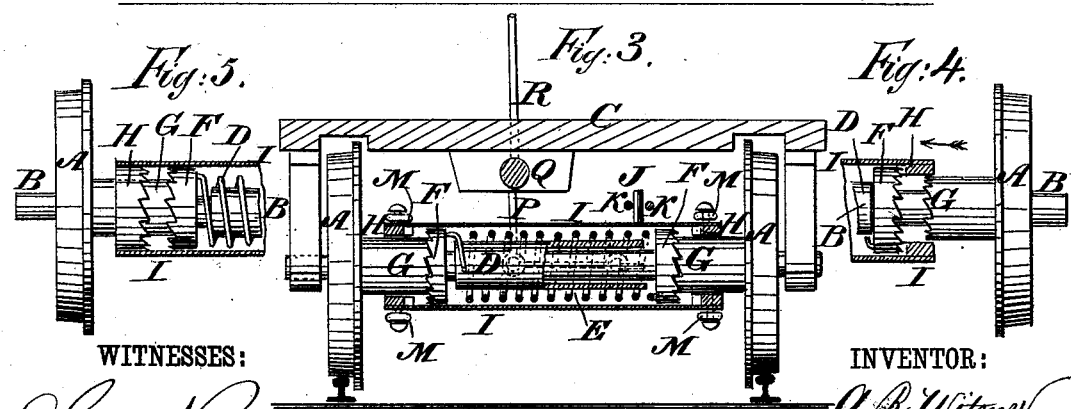

Figure 1 is an under-side view of the improvement. Fig. 2 is a sectional side elevation. Fig. 3 is a sectional end elevation. Fig. 4 shows one end of the spring disconnected from the axle. Fig. 5 shows one end of the spring connected with the axle.

Similar letters of reference indicate corresponding parts.

The object of this invention is to furnish car-starters so constructed that the momentum of the cars can be stored up and held to be used in starting the cars, and to assist the horses in drawing the cars up heavy grades and around curves, and which shall be simple in construction and easily controlled.

A are the wheels and B are the axles of a car, which are constructed and connected with the body C in the usual manner. Upon the middle part of each axle B is placed a loose sleeve, D, around which is coiled a spiral spring, E, the said sleeve preventing friction between the spiral spring E and the axle B when the said spring is put under tension. The ends of the spiral spring E are attached to clutch-collars F, placed loose upon the axle B, and the teeth of which when the said clutch-collars are left free are held in gear with the teeth of the clutch-collars G, permanently attached to the end parts of the axle B, so that the two clutch-collars F and the spiral spring E will be carried around by and with the axle B in its revolution. Upon the clutch-collars G are placed clutch-collars H, which are permanently attached to a tubular case, I, and are thus rigidly connected together, so that when one of the clutch-collars H is in gear with one of the clutch-collars F, the other clutch-collars H F must be out of gear. The clutch-collars F equal in thickness the combined thickness of the two concentric clutch-collars G H, so that the clutch-collars F can gear with either of the said clutch-collars G H, or with both at the same time. The case I surrounds the spring E and the teeth of all the clutch-collars F G H.

To the upper side of the case I is attached a pin, J, against the opposite sides of which rest the springs K, so as to hold the said case in a central position and the ratchet-wheels H out of gear, and to bring the said case into a central position when it is released after being moved in either direction. The springs K are attached at one end to the car-body A, and their other ends rest against the opposite sides of a pin, L, also attached to the car-body A, and which serves as a bearing-point for the springs K when under tension, and as a stop to prevent the said springs from carrying the case I beyond the central position.

To the upper and lower sides of the end parts of the case I, or to the screws that connect the clutch-collars H with the said case, are attached the ends of pairs of rods M, the other ends of which are secured to bars, blocks, or other supports, N, attached to the car-body C, to prevent the case I from being turned by a strain upon the clutch-collars H.

To the case I is hooked or otherwise hinged the end of a rod, O, the other end of which is hinged to the lower end of an arm, P, rigidly attached to a shaft, Q. The shaft Q is placed longitudinally with the car, and works in bearings attached to the body C of the car. To the ends of the shaft Q are attached upwardly-projecting arms R, which may be made long, to serve as levers for the driver to take hold of when operating the mechanism; or the arms R may be made short to receive a detachable lever, which can be transferred from one end of the car to the other, according as the horses are to be attached to one or the other end.

It will be observed that the teeth of the clutch-collars F project in opposite directions, so that one can be used while the car is going in one direction, and the other when the car is going in the other direction.

In using the mechanism, when the car is to be stopped the shaft Q is turned to one or the other side by means of the lever R, which moves the cases I, brings the clutch-collars H upon one side into gear with the clutch-collars F, pushes the clutch-collar F out of gear with the clutch-collar G, and holds one end of the spiral spring E stationary, so that the spiral springs E will be coiled by the revolution of the axles B until the car is stopped by the resistance of the springs E. When the car has been stopped, or when sufficient tension has been given to the springs E, the lever R is released, and the springs K bring the cases I back to a central position. As the clutch-collars H move back the clutch-collars F follow them until they come into gear with the clutch-collars G, which hold the clutch-collars F, and thus keep the springs E coiled. When thus arranged the car can be run for any desired distance without affecting the springs E.

When the car is to be started the lever R is moved in the other direction, which brings the clutch-collars H upon the other side into gear with the other clutch-collars, F, and pushes the clutch-collars F out of gear with the clutch-collars G, so that the tension of the springs E will revolve the axles B forward and start the car.

When the starter is to be used for assisting the horses in ascending a steep grade the lever R is occasionally operated to gradually coil the springs E, as the car has sufficient momentum to allow this to be done without checking the advance of the car, or when upon a down grade. Then as the car approaches the upper or steeper part of the grade and the horses need assistance the lever R is operated to cause the tension of the springs E to give a forward impulse to the car.

Having thus fully described my invention, I claim as new and desire to secure by Letters Patent—

1. A car-starter constructed substantially as herein shown and described, consisting of the spiral spring E, the clutch-collars F, attached to the ends of the spring E, the clutch-collars G, attached to the axles B, the clutch-collars H, attached to the cases I, the cases I, the centering-springs K, the holding-rods M, the connecting-rods O, the arms P, the shaft Q, and the lever R, as set forth.

2. The combination, with the case I, of the pins J L and the springs K K, as and for the purpose described.

3. In a car-starter, the combination, with the case I, of the connecting-rod O. the rigid arm P, the shaft Q, and the lever R, substantially as herein shown and described, whereby the case can be moved to throw the clutch-collars F G H into and out of gear, as set forth.

ABRAHAM R. WITMER.

Witnesses:
JAMES T. GRAHAM,
C. SEDGWICK.